United States Patent [19]
Dietz et al.

[11] Patent Number: 5,071,482
[45] Date of Patent: Dec. 10, 1991

[54] PIGMENT PREPARATIONS

[75] Inventors: Erwin Dietz, Kelkheim; Siegfried Schiessler, Bad Soden am Taunus; Manfred Urban, Wiesbaden, all of Fed. Rep. of Germany

[73] Assignee: Hoechst Aktiengesellschaft, Frankfurt am Main, Fed. Rep. of Germany

[21] Appl. No.: 410,159

[22] Filed: Sep. 20, 1989

[30] Foreign Application Priority Data

Sep. 21, 1988 [DE] Fed. Rep. of Germany ....... 3832065
Feb. 25, 1989 [DE] Fed. Rep. of Germany ....... 3905931

[51] Int. Cl.$^5$ .................... C09B 67/50; C08K 5/00
[52] U.S. Cl. .................... 106/498; 106/499; 106/411; 106/412; 106/413; 106/506
[58] Field of Search .............. 106/499, 506, 411, 496, 106/412, 413

[56] References Cited

U.S. PATENT DOCUMENTS 3,931,186 1/1976 Fuchts et al. .................. 260/282
3,973,981 8/1976 Miyatake et al. ................ 106/496

FOREIGN PATENT DOCUMENTS 2197461 2/1986 Japan .

OTHER PUBLICATIONS

Derwent Abstract, No. A0599.

Primary Examiner—William R. Dixon, Jr.
Assistant Examiner—C. Melissa Bonner

[57] ABSTRACT

Pigment preparations consisting of organic pigments and basic additives of the general formula I $(Q-A)_x Y$  (I)

in which Q is a radical of the formula II

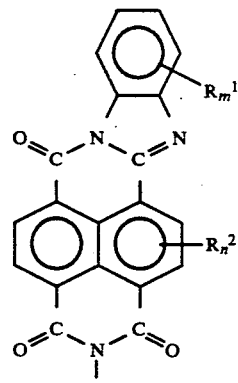

(II)

in which $R^1$ is halogen, an alkyl, alkoxy or cyano group, $R^2$ is halogen, m and n are integers from 0 to 4, A is a chemical bond or a divalent group from the series consisting of $-(CH_2)_p-$, $-CR^3R^4-$, arylene, $-S-$, $-O-$ and $-NR^5-$, in which p is an integer from 1 to 12, $R^3$ is hydrogen or alkyl, $R^4$ is alkyl and $R^5$ is hydrogen or alkyl, Y is a tertiary nitrogen atom or a group

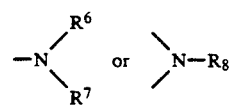

in which $R^6$, $R^7$ and $R^8$ are alkyl or alkenyl or a cycloaliphatic or araliphatic radical or an alkyleneheteroaryl radical, or Y is a saturated or unsaturated heterocyclic radical in which at least one tertiary nitrogen atom is included in the meanings mentioned for Y and x is a number from 1 to 6.

15 Claims, No Drawings

PIGMENT PREPARATIONS

The present invention relates to new pigment preparations consisting of organic pigments and basic additives of specific general structure which compared with the starting pigments with respect to dispersion behavior, resistance to flocculation, rheology, gloss behavior and color strength are considerably improved, and to the use of these pigment preparations for the pigmenting of high-molecular-weight materials and lacquer systems.

It is generally known that in the pigmenting of lacquers flocculation can cause considerable problems as shown during the application in particular by reduced color strength, unfavorable rheological behavior, poor gloss and surface defects of the coating layer.

It is known that the flocculation behavior of pigments can in certain cases be affected in a favorable manner by additives which contain basic groups. These additives are primarily base-substituted derivatives of pigments. Thus, German Patent Specifications 1,260,433 and 2,316,388 and German Offenlegungsschriften 2,500,509, 3,106,906 and 3,514,077 describe basic pigment derivatives of the general formula

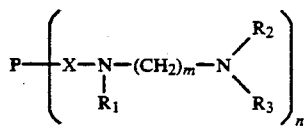

in which P is a pigment radical, x a bridge member and $R_1$, $R_2$ and $R_3$ are hydrogen or alkyl groups, as additives which are effective against flocculation. The preparation of pigment derivatives of this type is very complicated and expensive and usually leads to considerable pollution of the environment, since large amounts of sulfuric acid or chlorosulfonic acid have to be used for introducing the basic substituents.

A second group of basic pigment additives comprises polymers or polyaddition products in which basic groups are incorporated, such as the polyaddition compounds based on polyisocyanates and described in European Patent 154,678, in which free isocynate groups are reacted with amines and alcohols. The use of basic additives of this type is extremely limited, since with most pigments the flocculation behavior is only improved to a small extent or not at all.

A third group of basic pigment additives is represented by the preferably colorless organic compounds described in German Offenlegungsschrift 3,031,301 of the general formula

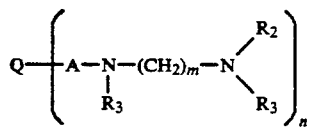

in which Q is an aromatic polycyclic compound and A a bridge member. As in the preparation of base-substituted pigments, considerable ecological problems arise from the preparation of compounds of this type. In addition, basic additives of this type have only a small effect or none at all on the flocculation behavior of most of the pigments.

A fourth group of basic pigment additives is represented by the reaction products of perylene-3,4,9,10-tetracarboxylic dianhydride with dialkylaminoalkylamines described in JP 62/197,461. However, compounds of this type usually have no or only a small effect on the flocculation behavior of pigments.

It was therefore the object to develop basic pigment additives (dispersants) for preventing flocculation of pigments, which are universally applicable in the area of polycyclic pigments and furthermore can also be used in the area of azo pigments. These additives must have effective basic groups, low solubility in lacquer systems which does not yet affect overspray fastness, and extensive interaction with the pigment particles.

It has now been found that pigment preparations of excellent resistance to flocculation can be obtained by mixing pigments with basic additives of the general formula I $$(Q-A)_x Y \tag{I}$$

in which in the general formula I mentioned Q is a radical of the general formula II

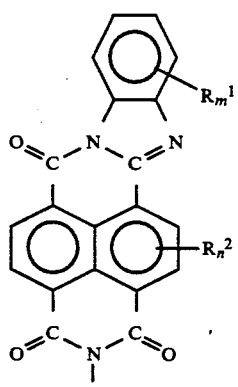

in which $R^1$ is a halogen atom, for example a fluorine, chlorine or bromine atom, a $C_1$–$C_4$-alkyl, $C_1$–$C_4$-alkoxy or cyano group, where in the case that m>1 $R^1$ can have a combination of the meanings mentioned, $R^2$ is a halogen atom, for example a chlorine or bromine atom, m and n are integers from 0 to 4, A is a chemical bond or a divalent group from the series consisting of —(CH$_2$)$_p$—, —CR$^3$R$^4$—, arylene, for example phenylene, —S—, —O— and —NR$^5$— or a chemically reasonable combination of these divalent groups, in which p is an integer from 1 to 12, $R^3$ is a hydrogen atom or a $C_1$–$C_6$-alkyl group, $R^4$ is a $C_1$–$C_6$-alkyl group and $R^5$ is a hydrogen atom or a $C_1$–$C_6$-alkyl group, Y is a tertiary nitrogen atom or a group

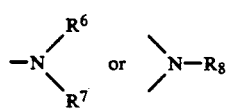

in which $R_6$, $R_7$ and $R_8$ are $C_1$–$C_{20}$-alkyl or $C_1$–$C_{20}$-alkenyl groups whose carbon chains can be interrupted by heteroatoms and/or can carry a terminal hydroxyl or primary amino group or acylamino group or can be a cycloaliphatic ($C_5$–$C_6$) or araliphatic radical or an alkylene heteroaryl radical, or Y is a saturated or unsaturated heterocyclic radical in which at least one tertiary nitrogen atom is included in the meanings mentioned for Y, and x is an integer from 1 to 6.

For the abovementioned group

in which $R_6$ and $R_7$ can, inter alia, be a cycloaliphatic ($C_5$–$C_6$) or araliphatic radical or an alkylene heteroaryl radical, there are enumerated, for example the N-cyclohexyl-N-methylamino group, N-methyl-N-(2-phenyl)-ethylamino group and N-methyl-N-[2-(3'-pyridyl)]-ethylamino group.

Preferably, pigments are mixed with basic additives of the general formula I mentioned in which in the radical Q m is 0 or 1 and n is 0, A is the divalent group —(CH$_2$)$_{(2-4)}$—, Y is a dialkyl($C_1$–$C_6$)amino group whose alkyl groups can carry terminal hydroxyl or primary amino groups or acylamino groups, or Y is a saturated or unsaturated heterocyclic radical in which at least one tertiary nitrogen atom is included in the meanings mentioned for Y, and x is an integer from 1 to 3.

Pigments are particularly preferably mixed with basic additives of the general formula I mentioned in which in the radical Q m and n are zero, A is the divalent group —(CH$_2$)$_{2-3}$—, Y is the dimethylamino or diethylamino group or an imidazole or piperazine radical and x is the number 1 or 2.

The present invention accordingly relates to new pigment preparations of organic pigments and basic additives of the abovementioned general formula I and to their use for the pigmenting of high-molecular-weight organic materials, for example in the form of plastic materials, melts, spinning solutions, lacquers, paints or printing inks.

The amounts of basic pigment additives of the general formula (I) mentioned, which are added to the pigments during the preparation of the pigment preparations, are not restricted, as long as the desired pigment quality is not affected, although it is preferred to use amounts of additives of 0.1–15% by weight, in particular 1 to 8% by weight.

The new pigment preparations can contain as pigment component not only an azo pigment but also a polycyclic pigment (see below).

The preparation of the basic pigment additives of the general formula I mentioned preferably starts from 1,8-naphthoylenebenzimidazole-4,5-dicarboxylic acid of the general formula III

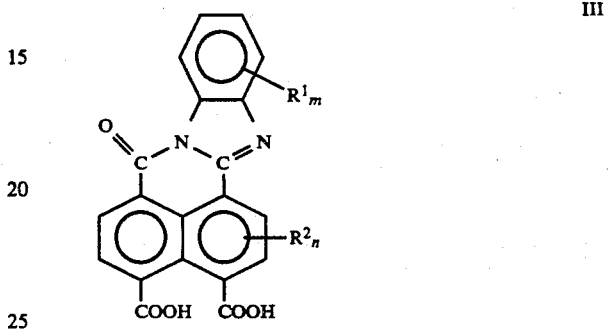

or the anhydride thereof by reaction with compounds which contain one or more primary amino groups and at least one tertiary amino group of sufficient basicity. The reaction is carried out at elevated temperature in glacial acetic acid, aqueous acetic acid, by acid catalysis in aqueous medium or inert organic medium. If compounds are used which contain only one primary amino group, the condensation of the basic pigment additives, starting from the substituted or unsubstituted naphthalene-1,4,5,8-tetracarboxylic acid, can also be carried out by the process described in German Offenlegungsschrift 2,246,110 by first reacting them with this amine and then, without isolation of the intermediate, reacting the product with the (substituted) 1,2-diaminobenzene.

Examples of amines which are suitable for the reaction are the amines of the following classes of compounds:

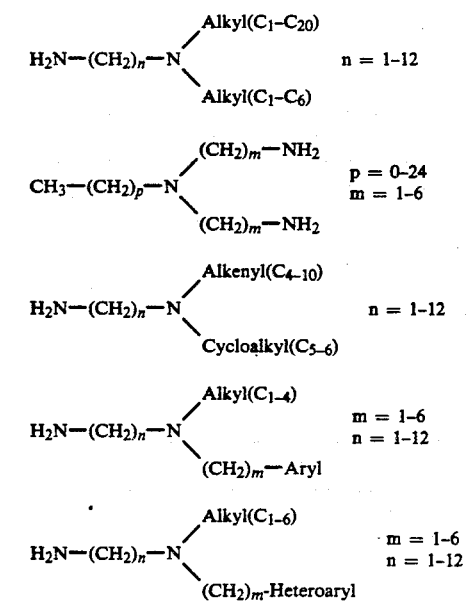

-continued
 m = 2-4
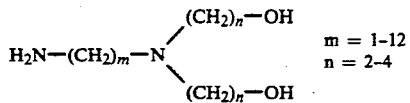 m = 1-12
n = 2-4
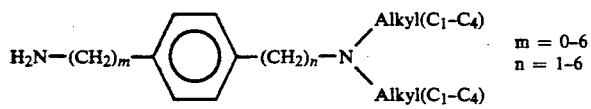 m = 0-6
n = 1-6
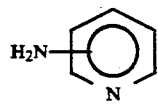
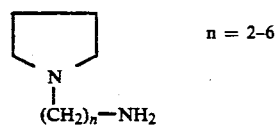 n = 2-6
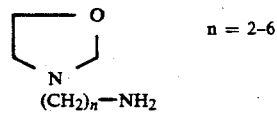 n = 2-6
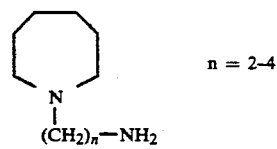 n = 2-4
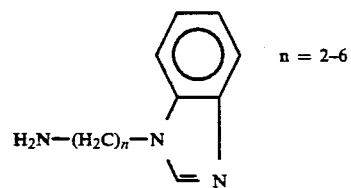 n = 2-6
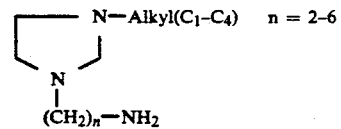 n = 2-6
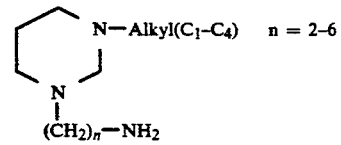 n = 2-6
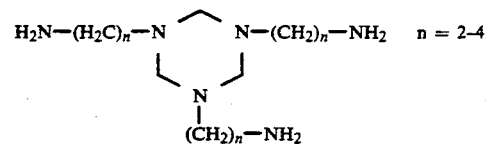 n = 2-4

-continued

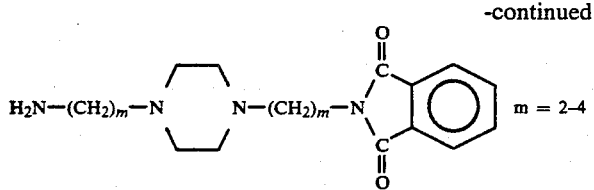

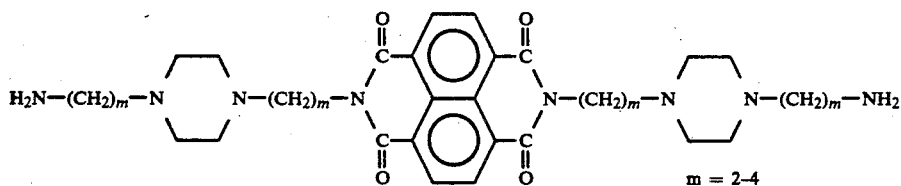

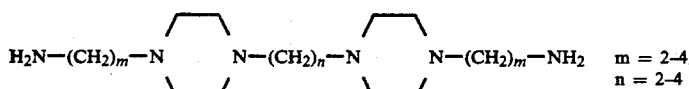

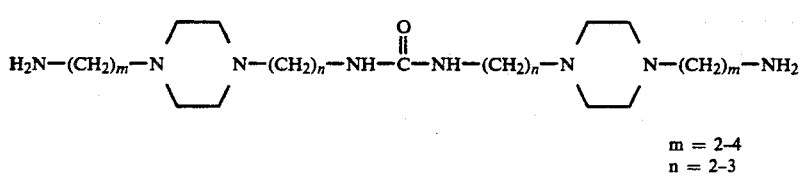

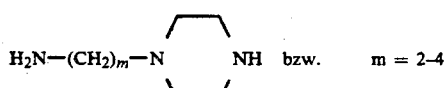

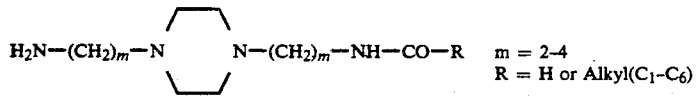

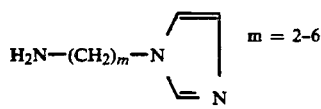

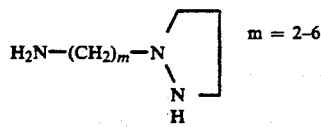

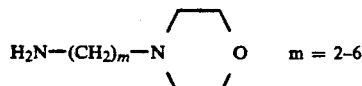

Inasfar as compounds which contain several primary amino groups are reacted, the reaction is preferably carried out in dilute aqueous acetic acid, although the condensation can in this case also be carried out in higher-boiling, inert organic solvents, such as, for example, quinoline. In this reaction, for each primary amino group one equivalent of the substituted or unsubstituted 1,8-naphthoylenebenzimidazole-4,5-dicarboxylic acid of the general formula III mentioned can be used. However, the reaction can also be carried out such that the reaction product still contains free amino groups. In both cases, pigment additives of high efficiency are obtained. The free primary amino groups can be partially or completely acylated either during the reaction or afterwards. These pigment additives also have high efficiency.

Particularly preferred basic pigment additives are, for example, the reaction products of 1,8-naphthoylenebenzimidazole-4,5-dicarboxylic acid of the formula IV

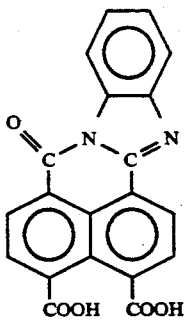

or the anhydride thereof with the following monovalent or divalent primary amines:

2-dimethylaminoethylamine, 2-diethylaminoethylamine, 3-dimethylaminopropylamine, 3-diethylaminopropylamine, 3-(N-ethyl-N-methyl)aminopropylamine, 3-(N-n-butyl-N-methyl)aminopropylamine, 3-(N-cyclohexyl-N-methyl)aminopropylamine, 3-[N-methyl-N-(2'-phenyl)ethyl]aminopropylamine, N-methyl-N-[2-(3-pyridyl)ethyl]-1,3-propylene-diamine, N-(3-aminopropyl)imidazole, N-(2-aminoethyl)imidazole, 1-(2-aminoethyl)piperazine, 1-(3-aminopropyl)piperazine, 1,4-bis(2-aminoethyl)piperazine and 1,4-bis(3-aminopropyl)piperazine.

Of these, the two last-mentioned divalent amines can be reacted with compound IV not only in the molar ratio of 1:1 but also in the molar ratio of 1:2 or in a molar ratio in between, preferably 1:1.5-1.9. The basic pigment additives obtained at a molar ratio of 1:1.5-2 are distinguished by being particularly sparingly soluble in organic solvents and lacquer systems, while having a high anti-flocculation effect. Instead of the two last-mentioned divalent amines, it is also possible to use their monoacyl derivatives, in particular their monoacetyl derivatives, for the reaction in a molar ratio of 1:1. If the reaction of the divalent amines with compound IV is carried out in a molar ratio of 1:1 in boiling glacial acetic acid, the basic pigment additive precipitates very predominantly in the form of the monoacetyl compound.

The basic additives obtained by the processes described have high efficiency and are of general applicability. They give pigment preparations of high resistance to flocculation not only with azo pigments but also with polycyclic pigments, such as, for example, anthraquinone, anthrapyrimidine, anthanthrone, quinacridone, quinophthalone, diketopyrrolopyrrole, dioxazine, flavanthrone, indanthrone, isoindoline, isoindolinone, isoviolanthrone, perinone, perylene, phthalocyanine, pyranthrone or thioindigo pigments. These pigments can be present not only as pure pigments but also in the form of physical mixtures or as mixed crystals of two or more pigments:

Particularly valuable pigment preparations are obtained by mixing the new basic additives with perinone or anthanthrone pigments, such as, for example, cis- and/or trans-naphthoylenebisbenzimidazole described in Fiat Final Report 1313-II or 4,10-dibromoanthanthrone.

The efficiency of the pigment additives and the quality of the pigment preparations are in a number of cases dependent on the application method of the pigment additives.

In the preparation of the pigment preparations, not only mixtures of pigments each having one basic additive but also mixtures of pigments simultaneously having several basic pigment additives can be prepared. The preparation of the pigment preparations can be carried out in various ways. Thus, for example, the basic pigment additives can be added to the water-moist pigment presscake and incorporated before drying. It is also possible to prepare dry mixtures of milled basic pigment additives with the pigment powder. However, in many cases, this does not lead to optimum results. It has proven to be suitable to add the basic pigment additives as early as the pigment preparation stage, either during the conversion into finely-divided form or during a subsequent solvent finish. Thus, for example, pigment and basic pigment additives can be subjected to a conjoint revatting finish. The basic pigment additives can also be added during a dry milling of a pigment with or without additional milling aids on a rolling and vibrating mill or during a wet milling of a pigment in aqueous, aqueous-organic or organic milling medium, for example on a pearl mill. The addition of the pigment additives before or during a pressure finish in aqueous, aqueous-organic or organic medium has also proven to be suitable.

The isolation of the pigment preparations from an aqueous, aqueous-organic or organic medium is preferably carried out in a neutral or alkaline pH range. The isolation from a strongly acidic medium is not advantageous due to the solubility of the basic pigment additives. The basic pigment additives can also be used in the form of their salts, for example the formates, acetates, chlorides or phosphates, for the preparation of the pigment preparations, provided it is ensured that the preparation is isolated from a neutral or alkaline medium.

The claimed pigment preparations can contain, in addition to pigment and basic pigment additives, further components, such as, for example, surfactants, resins or dust-removing agents.

The pigments according to the invention are particularly suitable for the pigmenting of high-molecular-weight organic materials. High-molecular-weight organic materials which can be pigmented by means of the claimed pigment preparations are, for example, cellulose ethers and esters, such as ethylcellulose, nitrocellulose, cellulose acetate, cellulose butyrate, natural resins or synthetic resins, such as polymerization resins or condensation resins, such as, for example, amino resins, in particular urea/formaldehyde and melamine/formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or in mixtures.

It makes no difference whether the high-molecular-weight organic compounds mentioned are present as plastic materials, melts or in the form of spinning solutions, lacquers, paints or printing inks. Depending on the intended use, it is advantageous to use the pigment preparations according to the invention as toners or in the form of preparations or dispersions. Relative to the high-molecular-weight organic material to be pigmented, the claimed pigment preparations are used in an amount of preferably 0.1 to 10% by weight.

Particularly preferred lacquer systems are baking enamels from the class of alkyd-melamine resin or acrylic-melamine resin lacquers and two-component lacquers based on polyisocyanate-crosslinkable acrylic resins. Of the large number of printing inks, printing inks based on nitrocellulose are particularly suitable.

The pigment preparations according to the invention are easily and very finely dispersible in many application mediums.

These dispersions have a high resistance to flocculation and show excellent rheological properties even at a high degree of pigmentation. They can be used to obtain coatings and prints of high color strength, high gloss and high transparency in combination with excellent fastness properties.

To evaluate the properties of the pigment preparations claimed in lacquer systems, from the large number of known systems, an alkyd-melamine resin lacquer (AM) based on a medium-oil non-drying alkyd resin consisting of synthetic fatty acids and phthalic anhydride and of a melamine resin etherified with butanol and portions of a non-drying alkyd resin based on ricinenic acid (short-oil) and an acrylic resin stoving enamel based on a non-aqueous dispersion (TSA-NAD) were selected. In the examples below, they are referred to under the designation "AM" and "TSA-NAD".

The rheology of the milled material after the dispersion (millbase rheology) is evaluated by means of the following five-step scale:

5 highly fluid
4 fluid
3 viscous
2 slightly set
1 set

After dilution of the milled material to the pigment concentration, the viscosity was evaluated by means of the "Viscospatula" of Rossmann, Type 301, from ERICHSEN. Gloss measurements were carried out at an angle of 20° according to DIN 67530 (ASTMD 523) by means of a multi-gloss glossimeter from BYK-MALLINCKRODT.

In the examples below, parts and percentages are by weight. The unsubstituted radical Q which often occurs in the examples and has the formula V

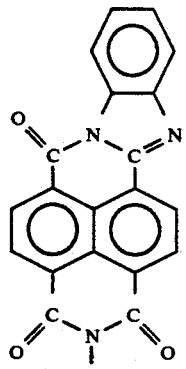

is abbreviated to Q'.

EXAMPLE 1 a) 25 parts of trans-naphthoylenebisbenzimidazole (Pigment Orange 43; C.I. 71105) are stirred into a solution of 75 parts of potassium hydroxide in 440 parts of 80% strength ethanol (water content: 20%). The mixture is then boiled for 2 hours with thorough stirring. After cooling to 20° to 30° C., the coarse-crystalline precipitate is thoroughly filtered off with suction. This gives 55 parts of an almost colorless filter cake in which the transnaphthoylenebisbenzimidazole is present in the form of the potassium hydroxide addition product (hereinafter called separating salt).

b) The 55 parts of the separating salt are introduced at 65° to 70° C. into 600 parts of water over a period of 15 minutes with thorough stirring. Stirring at 65° to 70° C. is continued for 1 hour. 1 part of the compound of the formula

is then added to the orange-colored suspension, and the mixture is stirred at 65° to 70° C. for another hour. The suspension is then filtered off with suction, and the pigment is washed neutral with hot water. The pigment is dried at 60° C. in a vacuum drying cabinet and then milled on a pinned disk mill. This gives 25 parts of an orange-colored pigment.

c) Testing of pigments in AM lacquer:

To test the pigments in an AM lacquer, the pigment-/lacquer mixture which contains 15% of pigment is first subjected to milling in a vibrating or pearl mill for the purpose of dispersion. The rheology of the milled material (millbase rheology) is rated with marks from 1 (set) to 5 (highly fluid). The milled material is then diluted by addition of further AM lacquer to give a full shade lacquer which contains 5% of pigment. The viscosity of the full shade lacquer is determined by means of the "visco-spatula". A portion of the full shade lacquer is diluted with 25% strength white lacquer such that the ratio of colored to white pigment is 1:10 (1:10 reduction). Both this lacquer and the full shade lacquer are applied to white coated board and baked at 140° C. for 30 minutes. The full shade coating serves to determine the hiding power and the translucence of the pigment, and the 1:10 reduction to evaluate the color strength.

To determine the gloss, a portion of the full shade lacquer is adjusted to a viscosity of 4 seconds ("viscospatula" measurement) by addition of an n-butanol/xylene mixture (1:4). The lacquer is then poured onto a sheet and, after evaporation of the solvent, baked at 140° C. for 30 minutes.

To test the resistance to flocculation (rub-out test), the full shade lacquer which has been diluted to a ratio of 1:10 of colored to white pigment by means of white lacquer is applied to a white coated board. After a short period of initial drying, the coating is rubbed with a finger at one spot. The coating is then baked at 140° C. for 30 minutes. In a flocculation-resistant pigment, no difference in color strength between the rubbed area and the remainder occurs, while in flocculating pigments considerable differences in color strength occur.

The test procedures described were carried out completely only in some of the examples which follow.

d) The pigment obtained according to Example 1b) has a gloss of 80 and a full shade viscosity of 3.7 seconds. The pigment has a high color strength and does not flocculate.

e) If the pigment is prepared analogously to Example 1a) and 1b), except that the addition of the basic pigment additive is omitted, a pigment is obtained which in the lacquer test has a full shade viscosity of 5.3 seconds and a gloss of only 30. The pigment shows considerable flocculation and has a much weaker color strength compared with the pigment obtained according to Example 1d).

EXAMPLE 2

In accordance with the details of Example 1a) and 1b), further orange pigments were prepared using the additives listed in the table below in the amounts given instead of the basic pigment additive used in Example 1b).

| | Additive | Amount of additive (parts) | Gloss | Full shade viscosity (sec.) | Increase in color strength + small ++ med. +++ strong |
|---|---|---|---|---|---|
| 1) | — | — | 30 | 5.3 | — |
| 2) | Q'—(CH$_2$)$_3$—N(C$_2$H$_5$)$_2$ | 1.3 | 88 | 5.0 | +++ |
| 3) | Q'—(CH$_2$)$_2$—N(C$_2$H$_5$)$_2$ | 1 | 88 | 2.4 | +++ |
| 4) | Q'—(CH$_2$)$_3$—N(CH$_3$)$_2$ | 1 | 88 | 3.2 | +++ |
| 5) | Q'—(CH$_2$)$_3$—N⟨piperazine⟩N—(CH$_2$)$_3$—NH—CO—CH$_3$ | 1 | 85 | 3.6 | +++ |
| 6) | " | 0.5 | 89 | 2.6 | +++ |
| 7) | " | 0.2 | 64 | 5.5 | ++ |
| 8) | Q'—(CH$_2$)$_3$—N⟨imidazole⟩ | 1 | 88 | 4.0 | +++ |
| 9) | " | 0.5 | 86 | 2.9 | +++ |
| 10) | " | 0.2 | 44 | 5.0 | ++ |
| 11) | Q'—(CH$_2$)$_2$—N⟨piperazine⟩NH | 1 | 60 | 5.2 | +++ |
| 12) | Q'—(CH$_2$)$_2$—N⟨morpholine⟩O | 1 | 50 | 5.3 | ++ |
| 13) | Q'—(CH$_2$)$_2$—N⟨pyrrolidine⟩ | 1 | 85 | 3.0 | +++ |
| 14) | Q'—(CH$_2$)$_3$—N(C$_{12}$H$_{25}$)((CH$_2$)$_3$—NH$_2$) | 1 | 80 | 5.0 | +++ |
| 15) | (Q'—(CH$_2$)$_3$)$_2$N—C$_{12}$H$_{25}$ | 1 | 60 | 4.8 | ++ |
| 16) | (Q'—(CH$_2$)$_2$)$_2$N—(CH$_2$)$_2$—NH$_2$ | 1 | 50 | 4.7 | ++ |
| 17) | Q'—(CH$_2$)$_2$—N((CH$_2$)$_2$—NH$_2$)$_2$ | 1 | 40 | 7.0 | ++ |

| | Additive | Amount of additive (parts) | Gloss | Full shade viscosity (sec.) | Increase in color strength + small ++ med. +++ strong |
|---|---|---|---|---|---|
| 18) |  | 1 | 88 | 3.4 | +++ |

EXAMPLE 3 a) 55 parts of separating salt obtained according to Example 1a) are stirred into 600 parts of water at 65°–70° C. over a period of 10 minutes. The mixture is then stirred at 65° to 70° C. for 1 hour. A mixture of 0.35 part of compound A and 0.15 part of compound B

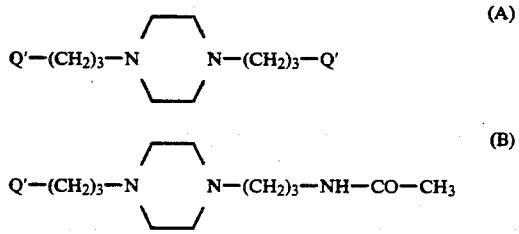

is then added to the suspension, and the mixture is stirred at 65° to 70° C. for another hour. 30 parts of isobutanol are then added to the suspension, which is then refluxed for 3 hours. The isobutanol is then driven off by steam distillation, and the suspension is filtered. The pigment obtained is washed neutral with hot water, dried at 60° C. and milled.

In the test in AM lacquer, the pigment is distinguished by a high color strength and a gloss of 87. The millbase rheology is rated with 4. The overspray fastness is excellent.

b) The procedure according to Example 3a) is repeated, except that 0.2 part of compound A and 0.3 part of compound B are added, to give an equivalent pigment.

c) If the same amount of n-pentanol is used instead of isobutanol, an equivalent pigment is obtained.

d) The procedure analogously to Example 3a) is repeated, except that compounds A and B are not added, to give a pigment of weak color strength which in the test in AM lacquer has a millbase rheology of 1 and a gloss of 35.

EXAMPLE 4 a) 55 parts of separating salt obtained according to Example 1a) are stirred into 600 parts of water at 65° to 70° C. over a period of 10 minutes. The mixture is stirred at 65° to 70° C. for one hour. 0.75 part of compound B

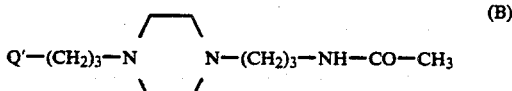

is then added to the suspension, and the mixture is stirred at 65° to 70° C. for another hour. The pigment suspension is then filtered off with suction, and the filter cake is washed neutral with hot water. The filter cake is stirred into 400 parts of isobutanol. The mixture is then heated to boiling, and the water is removed continuously via a water separator. The mixture is then refluxed for another 3 hours. The isobutanol is then distilled off by steam distillation, while adding water, and the aqueous suspension is filtered off with suction. The pigment is dried at 60° C. and milled.

Upon incorporation in AM and TSA/NAD lacquers, the pigment obtained gives very strong colorations which have excellent overspray fastness. In the AM and TSA lacquer, the gloss values are in the range 80 to 85. The millbase rheology is in both lacquer systems rated with 5. The pigment does not flocculate and gives a very good rub-out test.

If, however, the addition of compound B is omitted in the preparation of the pigment, a pigment of very weak color strength which shows very considerable flocculation, has a gloss of only 35 in AM lacquer and a very unfavorable millbase rheology (1) is obtained.

b) If in the process according to Example 4a) the additive used is a mixture of 0.40 part of compound B and 0.35 part of compound A or a mixture of 0.35 part of compound A and 0.40 part of compound C or a mixture of 0.50 part of compound B and 0.25 part of compound D

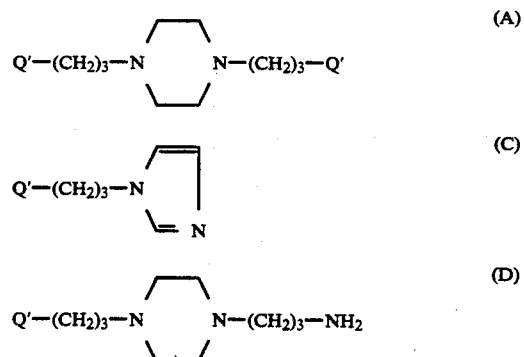

instead of 0.75 part of compound B, pigments of the same quality are obtained.

c) If in the procedure according to Example 4a xylene is used instead of isobutanol as the finishing medium, valuable pigments are obtained which, compared with the pigments obtained according to Example 4a), are more hiding and have an even purer shade.

d) If in the procedure according to Example 4a) 0.85 part of one of the two compounds of the formulae

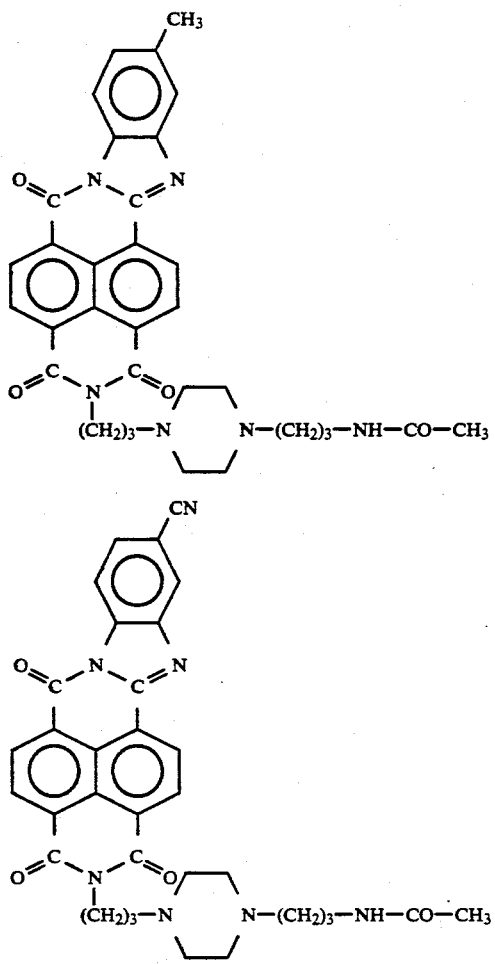

is used instead of 0.75 part of compound B, pigments of comparable quality are obtained.

e) If in the procedure according to Example 4a) 0.9 part of the compound of the formula

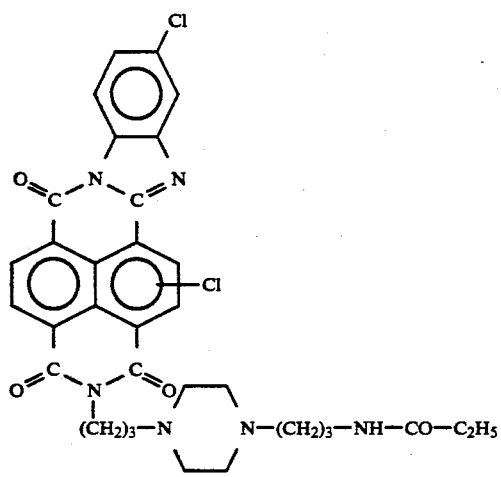

is used instead of 0.75 part of compound B, valuable pigments are also obtained.

f) If in the procedure according to Example 4a) the 0.75 part of compound B is not added to the aqueous pigment suspension but is added to the suspension obtained by stirring the filter cake which has been washed neutral into the isobutanol, a pigment of the same quality is obtained.

EXAMPLE 5 a) 0.1 part of compound C

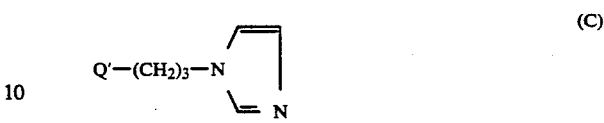

is added to 25 parts of trans-naphthoylenebisbenzimidazole (C.I. Pigment Orange 43, 71105) which has been prepared according to Fiat Final Report 1313-II by the procedure given for indanthrene Brilliant Orange GR, dried and milled, and the two are mixed with one another. In the test in AM lacquer, compared with the pigment without additive, a color strength which is higher by 10% and a purer and more yellowish shade are obtained.

b) If in the procedure according to Example 5a) only 0.05 part is used instead of 0.1 part of compound C, a color strength which is higher by 5% is obtained in the test in AM lacquer.

c) If the pigment obtained according to Example 5a) is used in an application medium having a high xylene content, no loss in color strength occurs even if the pigment dispersion is allowed to stand for a fairly long period of time at room temperature. In contrast, a considerable decrease in color strength occurs in this case, if the pigment without addition of compound C is used.

EXAMPLE 6 a) 30 parts of cis-naphthoylenebisbenzimidazole (C.I. Vat Red 15, 71100) of the α-modification are stirred into 470 parts of chlorobenzene. 1.3 part of 33% strength sodium hydroxide solution are added, and the mixture is stirred at 20° to 30° C. for 1 hour. It is then heated to boiling and refluxed for 3 hours. It is then cooled to 70° to 80° C., and 1.5 parts of compound B

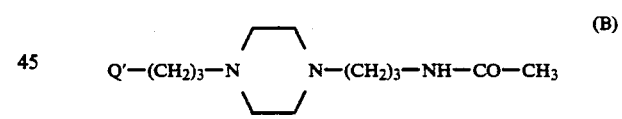

are added. The mixture is stirred at 70° to 80° C. for 1 hour. Water is then added, and the chlorobenzene is distilled off by means of steam. The product is then filtered off with suction, the filter cake is washed with hot water and dried at 60° C. in a vacuum drying cabinet. The pigment is milled on a pinned disk mill.

31.5 parts of a red pigment which is present in the β-modification are obtained.

In the test in AM lacquer, strong red colorations are obtained. The millbase rheology (15% strength) is rated with 5 and the gloss with 85. The pigment does not flocculate.

If in the pigment preparation according to Example 6a) the addition of compound B is omitted, a pigment is obtained which has a millbase rheology of only 1 to 2 and a gloss of only 30.

b) If in the process according to Example 6a) 30 parts of a mixed crystal pigment of the α- modification composed of 27 parts of cis-naphthoylenebisbenzimidazole (C.I. Vat Red 15) and 3 parts of trans-naphthoylenebisbenzimidazole (Pigment Orange 43) are used instead of 30 parts of cis-naphthoylenebisbenzimidazole, a pigment of the same quality is obtained.

c) If in the process according to Example 6a) 1.5 parts each of the compounds of the formulae

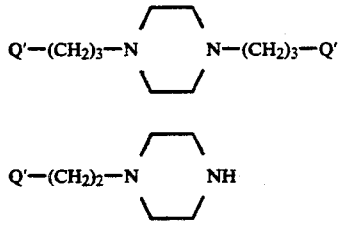

are used instead of 1.5 parts of compound B, pigments of the same quality are obtained.

d) If in the process according to Example 6a) 2.5 parts of compound B are used instead of 1.5 parts of this compound, a pigment is obtained which even in a 24% strength pigment dispersion still has a millbase rheology of 3–4.

EXAMPLE 7 a) 80 parts of 4,10-dibromoanthanthrone (C.I. Pigment Red 168, 59300) are dissolved in 640 parts of 100% pure sulfuric acid at 20° to 30° C. with thorough stirring. 224 parts of 50% strength sulfuric acid are then run in at 20° to 30° C. over a period of about 2 hours with cooling. Stirring at 20° to 30° C. is continued for several hours. The product is then filtered off with suction, and the filter cake is washed with 2800 parts of 85% strength sulfuric acid. The filter cake is then washed neutral with water. This gives 196 parts of a 40% strength aqueous filter cake (which corresponds to 78.4 parts of Pigment Red 168).

b) The filter cake obtained according to Example 7a) is stirred in 128 parts of water. 2 parts of the compound of the formula

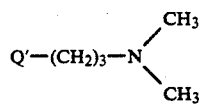

are then stirred in, and the suspension is then poured into a pearl mill of the type Drais PM1 which is filled with zirconium oxide beads 1 to 1.5 mm in diameter. The suspension is milled in the pearl mill for 2 hours at a rotational speed of about 2700 rpm. The suspension is then separated off from the beads by screening, and the beads are washed with about 260 parts of water. This gives about 580 parts of a dilute aqueous pigment suspension. 80 parts of isobutanol are added to this suspension. It is then heated to boiling and refluxed for 3 hours. The isobutanol is then distilled off by steam distillation. The pigment is filtered off with suction, washed with water and dried at 80° C. in a vacuum drying cabinet. This gives 79.3 parts of a pigment of high color strength which in AM lacquer has a gloss of 80 and whose millbase rheology is rated with 4.

If in the process according to Example 7b) the addition of the basic pigment additive is omitted, a pigment is obtained which in AM lacquer has a color strength which is about 15% lower, whose millbase rheology is only rated with 1 and which has a gloss of only 64.

c) If in the process according to Example 7b) only 0.8 part of the basic pigment additive is added instead of 2 parts, a pigment is obtained which in AM lacquer has a gloss of 75 and whose millbase rheology is rated with 2 to 3. Compared with a pigment prepared by the same process without addition of the basic pigment additive, the pigment has a color strength which is about 5% higher.

d) If in the process according to Example 7b) an equivalent amount of filter cake obtained by the process described in Fiat Final Report 1313-II for the preparation of indanthrene Brilliant Orange RK is used instead of the filter cake obtained according to Example 7a), a pigment of comparable quality is obtained.

EXAMPLE 8

If in the process according to Example 7b) the pigment additives listed in the table below are used instead of the basic pigment additive used in Example 7b), the following results are obtained:

| Additive | Amount of additive (Parts) | Gloss | Millbase rheology | Full shade viscosity (sec.) | Increase in color strength |
|---|---|---|---|---|---|
| 1) — | — | 64 | 1 | 4.1 | — |
| 2) Q'—(CH₂)₃—N⌒N—(CH₂)₃—NH—CO—CH₃ | 2 | 75 | 4 | 3.3 | +5% |
| 3) Q'—(CH₂)₃—N⌒N—(CH₂)₃—Q' | 2 | 83 | 2–3 | 3.1 | +10% |
| 4) " | 4 | 80 | 4 | 2.6 | +12% |
| 5) Q'—(CH₂)₃—N⌒N | 2 | 82 | 3–4 | 3.4 | +10% |

| Additive | Amount of additive (Parts) | Gloss | Millbase rheology | Full shade viscosity (sec.) | Increase in color strength |
|---|---|---|---|---|---|
| 6) Q'—(CH₂)₂—N⌒NH⌣ | 2 | 81 | 4–5 | 3.7 | +4% |
| 7) Q'—(CH₂)₃—N(C₁₂H₂₅)(CH₂)₃—NH₂ | 2 | 81 | 3–4 | 3.4 | +8% |

EXAMPLE 9

39 parts of Indanthrene Brilliant Orange RK (C.I. Pigment Red 168) prepared by the process described in Fiat Final Report 1313-II and then dried are stirred together with 1 part of the compound of the formula

Q'—(CH₂)₃—N⌒N—(CH₂)₃—NH—CO—CH₃⌣ in 1000 parts of water. 80 parts of 33% strength sodium hydroxide solution and 60 parts of sodium dithionite are then added. The mixture is stirred at 20° to 25° C. for 3 hours under a nitrogen atmosphere, during which vatting takes place. 22.3 parts of 85% strength phosphoric acid are then slowly run in at 20° to 25° C. This brings the pH to 10 to 11. After stirring at 20° to 25° C. for one hour, 90 parts of 35% strength hydrogen peroxide are run in at 20° to 25° C., while maintaining the pH in the range of 10 to 11 by simultaneously running in 46.3 parts of 33% strength sodium hydroxide solution. Stirring at 20° to 25° C. is continued for 15 hours. The pigment suspension is then filtered off with suction, and the filter cake is washed neutral with water. The filter cake is then stirred in 224 parts of water. After the addition of 2.8 parts of sodium carbonate and 40 parts of nitrobenzene, the mixture is heated to boiling and refluxed for 3 hours. The nitrobenzene is then distilled off by steam distillation. The pigment suspension is filtered off with suction, and the filter cake is washed neutral with water. The pigment is dried at 80° C. and milled. This gives 38.8 parts of a pigment of high color strength which has a gloss of 87. The millbase rheology is rated with 5.

EXAMPLE 10 a) 20 parts of the azo pigment Pigment Red 188 (12467) and 1 part of the additive of the formula

Q'—(CH₂)₃—N⌒N—(CH₂)₃—NH—CO—CH₃⌣ are thoroughly mixed in finely milled form. This pigment preparation does not flocculate and has a higher color strength than the pigment without the additive. The comparison of the other coloristic properties in AM lacquer is shown in the table:

|  | Viscosity (sec.) | Millbase rheology | Gloss |
|---|---|---|---|
| without additive | 3.7 | 2–3 | 50 |
| with additive | 2.7 | 5 | 89 | b) If only 0.6 part of the additive is used instead of 1 part, a pigment preparation is obtained which is equivalent to that obtained according to Example 10a).

EXAMPLE 11

20 parts of the azo pigment C.I. Pigment Orange 36 (11780, hiding form) and 1 part of the additive used in Example 10a) are thoroughly mixed in milled form. In the test in AM lacquer, the pigment preparation obtained has a color strength which is about 10% higher than that of the pigment without additive.

EXAMPLE 12

20 parts of the azo pigment C.I. Pigment Brown 25 (12510) and 0.6 part of the additive used in Example 10a) are thoroughly mixed in milled form. In the test in AM lacquer, the pigment preparation obtained shows a gloss of 75, while the pigment without additive only has a gloss of 40.

EXAMPLE 13

20 parts of C.I. Pigment Yellow 110 (56280) of the formula

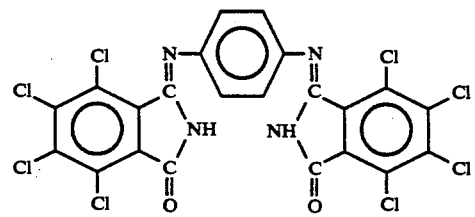

and 0.6 part of the additive used in Example 10a) are thoroughly mixed in milled form. In the test in AM lacquer, the pigment preparation obtained shows a gloss of 45, while the pigment without additive only has a gloss of 22.

EXAMPLE 14

20 parts of C.I. Pigment Red 254 of the formula

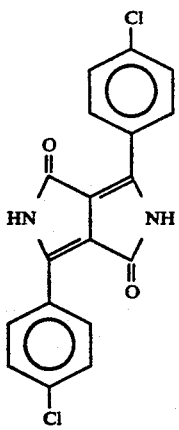

0.6 part of the additive used in Example 10a) are thoroughly mixed in milled form. In the test in AM lacquer, the pigment preparation obtained shows a gloss of 87, while the pigment without additive only has a gloss of 65.

EXAMPLE 15

20 parts of C.I. Pigment Red 149 (71137) of the formula

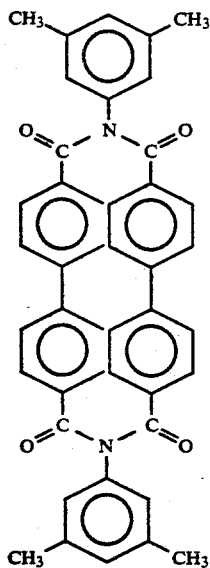

and 1 part of the additive used in Example 10a) are thoroughly mixed in milled form. In the test in AM lacquer, starting with a full shade lacquer containing 3% of pigment, the pigment preparation obtained shows a gloss of 68, while the pigment without additive only has a gloss of 30.

We claim:

1. A pigment preparation comprising:
   (a) an organic pigment, and
   (b) as an additive with dispersant properties for preventing flocculation of a said pigment, a basic compound of the general formula I $(Q-A)_xY$   (I)

in which Q is a radical of the general formula II

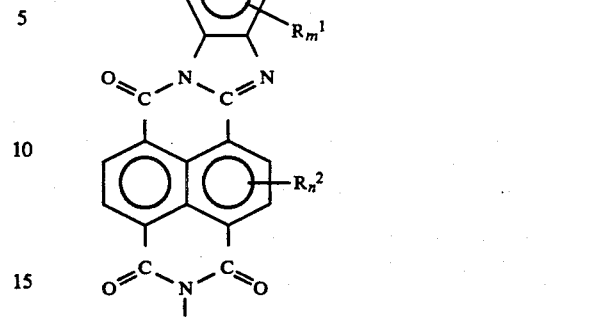

in which $R^1$ is a halogen atom, a $C_1$-$C_4$-alkyl, $C_1$-$C_4$-alkoxy or cyano group, where in the case that $m > 1$, $R^1$ can have a combination of the meanings mentioned; $R^2$ is a halogen atom, m and n are integers from 0 to 4, A is a chemical bond or the divalent group, —(CH$_2$)$_p$—, —CR$^3$R$^4$—, arylene, —S—, —O— or —NR$^5$—, alone or in a chemically reasonable combination, in which p is an integer from 1 to 12, $R^3$ is a hydrogen atom or a $C_1$-$C_6$-alkyl group, $R^4$ is a $C_1$-$C_6$-alkyl group and $R^5$ is a hydrogen atom or a $C_1$-$C_6$-alkyl group, Y is a tertiary nitrogen atom or a group

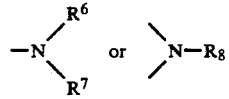

in which $R^6$, $R^7$ and $R^8$ are $C_1$-$C_{20}$-alkyl or $C_1$-$C_{20}$-alkenyl groups whose carbon chains are not interrupted or are interrupted by heteroatoms and are unsubstituted or substituted by a terminal hydroxyl, primary amino group or an acylamino group or are cycloaliphatic (C$_5$-C$_6$), araliphatic or alkylene-heteroaryl radicals, or Y is a saturated or unsaturated heterocyclic radical in which at least one tertiary nitrogen atom is included in the meanings mentioned for Y, and x is an integer from 1 to 6.

2. A pigment preparation as claimed in claim 1, wherein in the radical Q of said general formula II, m is 0 or 1 and n is 0, A is the divalent group —(CH$_2$)$_{2-4}$—, Y is a dialkyl(C$_1$-C$_6$)amino group whose alkyl groups are unsubstituted or substituted by terminal hydroxyl or primary amino groups or acylamino groups or Y is a saturated or unsaturated heterocyclic radical which contains at least one tertiary nitrogen atom and x is an integer from 1 to 3.

3. A pigment preparation as claimed in claim 1, wherein a pigment contained therein is an azo pigment or a polycyclic pigment.

4. A pigment preparation as claimed in claim 1, wherein a pigment contained therein is a polycyclic pigment of the anthraquinone, anthrapyrimidine, anthanthrone, quinacridone, quinophthalone, diketopyrrolopyrrole, dioxazine, flavanthrone, indanthrone, isoindoline, isoindolinone, isoviolanthrone, perinone, perylene, phthalocyanine, pyranthrone or thioindigo series.

5. A pigment preparation as claimed in claim 1, wherein a pigment contained therein is present as a pure pigment or in the form of a physical mixture or as mixed crystals of two or more pigments.

6. A pigment preparation as claimed in claim 1, wherein a pigment contained therein is from the series of perinone or anthanthrone pigments.

7. A pigment preparation as claimed in claim 1, wherein the pigment preparation comprises 99.9 to 85% by weight of one or more organic pigments and 0.1 to 15% by weight of at least one basic additive of said general formula I of claim 1.

8. A pigment preparation as claimed in claim 1, wherein the pigment preparation comprises 99 to 92% by weight of one or more organic pigments and 1 to 8% by weight of at least one basic additive of said general formula I of claim 1.

9. A method for the pigmenting of a high-molecular-weight organic material comprising the step of pigmenting the organic material with a pigment preparation of claim 1.

10. A method for the pigmenting of a lacquer system comprising the step of pigmenting the lacquer system with a pigment preparation of claim 1.

11. A pigment preparation comprising an organic pigment and a basic additive of the general formula I $(Q-A)_xY$          (I)

in which Q is a radical of the general formula II

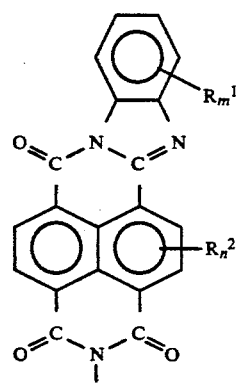

(II)

in which $R^1$ is a halogen atom, a $C_1$-$C_4$-alkyl, $C_1$-$C_4$-alkoxy or cyano group, where in the case that $m > 1$ $R^1$ can have a combination of the meanings mentioned, $R^2$ is a halogen atom, m and n are integers from 0 to 4, A is a divalent group of the formula $-(CH_2)_p-$, where p is 2 or 3, Y is a dimethylamino group, a diethylamino group, an imidazole radical, or a piperazine radical, and x is the number 1 or 2, or Y is the radical

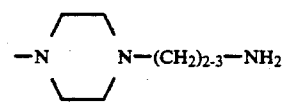

or the radical

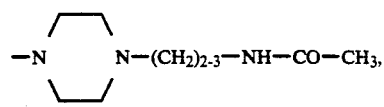

in which case x is 1, or Y is the divalent radical

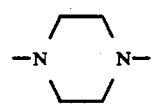

in which case x is 2.

12. A pigment preparation as claimed in claim 11, wherein in the radical Q of the general formula II mentioned there m and n are zero, A is the divalent group $-(CH_2)_{2-3}-$, Y is the dimethylamino or diethylamino group or an imidazole or piperazine radical and x is the number 1 or 2.

13. A pigment preparation as claimed in claim 11, wherein in the radical Q of the general formula II mentioned there m and n are zero, A is the divalent group $-(CH_2)_{2-3}-$, Y is the radical

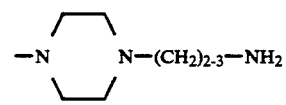

or the radical

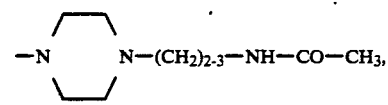

and x is 1.

14. A pigment preparation as claimed in claim 11, wherein in the radical Q of the general formula II mentioned there m and n are zero, A is the divalent group $-(CH_2)_{2-3}-$, Y is the divalent radical

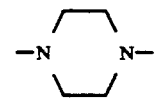

and x is 2.

15. A pigment preparation comprising a cis- or trans-naphthoylenebisbenzimidazole pigment or a cis/trans mixture of said pigments or the pigment 4,10-dibromoanthanthrone and a basic additive of the general formula I $(Q-A)_xY$          (I)

in which Q is a radical of the general formula II

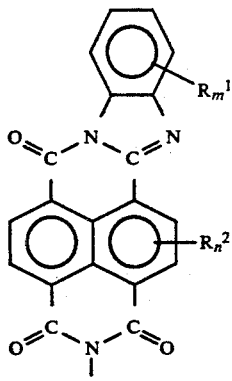

(II)

in which $R^1$ is a halogen atom, a $C_1$-$C_4$-alkyl, $C_1$-$C_4$-alkoxy or cyano group, where in the case that m>1 $R^1$ can have a combination of the meanings mentioned, $R^2$ is a halogen atom, m and n are integers from 0 to 4, A is a chemical bond or one or more of the divalent groups —$(CH_2)_p$—, —$CR^3R^4$, arylene, —S—, —O—, or —$NR^5$— or a chemically reasonable combination of these divalent groups, in which p is an integer from 1 to 12, $R^3$ is a hydrogen atom or a $C_1$-$C_6$-alkyl group, $R^4$ is a $C_1$-$C_6$-alkyl group and $R^5$ is a hydrogen atom or a $C_1$-$C_6$-alkyl group, Y is a tertiary nitrogen atom or a group

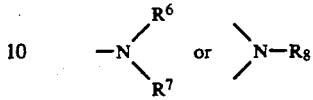

in which $R^6$, $R^7$ and $R^8$ are $C_1$-$C_{20}$-alkyl or $C_1$-$C_{20}$-alkenyl groups whose carbon chains are not interrupted or are interrupted by heteroatoms and are unsubstituted or substituted by a terminal hydroxyl, primary amino group or an acylamino group or are cycloaliphatic ($C_5$-$C_6$), araliphatic or alkylene-heteroaryl radicals, or Y is a saturated or unsaturated heterocyclic radical in which at least one tertiary nitrogen atom is included in the meanings mentioned for Y, and x is an integer from 1 to 6.

* * * * *

UNITED STATES PATENT AND TRADEMARK OFFICE
CERTIFICATE OF CORRECTION

PATENT NO.: 5,071,482

DATED: December 10, 1991

INVENTOR(S): Erwin Dietz, Siegfried Schiessler and Manfred Urban

It is certified that error appears in the above-identified patent and that said Letters Patent is hereby corrected as shown below:

```
Column 21,line 25, the formula should read:
```

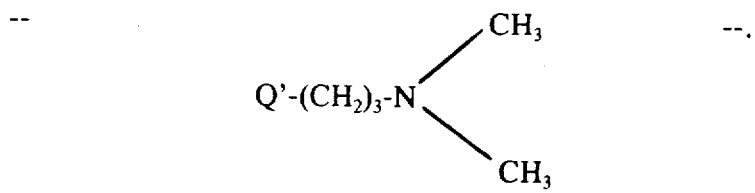

In the Abstract (at column 2, line 30) and in claim 1 (at column 24, line 5), and in claim 15 (at column 27, line 5), in the general formula II:

"$Rm^1$" should read --$R^1m$--, and

"$Rn^2$" should read --$R^2n$--.

Signed and Sealed this

Thirteenth Day of April, 1993

Attest:

STEPHEN G. KUNIN

*Attesting Officer*    *Acting Commissioner of Patents and Trademarks*